United States Patent Office 2,821,353
Patented Jan. 28, 1958

2,821,353
TREE SUPPORT
Theodore W. Hasenohrl, Erie, Pa.
Application April 18, 1955, Serial No. 501,946
3 Claims. (Cl. 248—44)

This invention relates to supports and more particularly to Christmas tree supports and bases.

Evergreen trees which are frequently used for Christmas trees often have curved trunks which make it difficult to support the trunk of the tree in a generally vertical position to give a pleasing symmetrical appearance with the ordinary type of Christmas tree foot.

It is, accordingly, an object of this invention to provide a Christmas tree foot for supporting Christmas trees wherein the device is simple in construction, economical to manufacture, and simple and efficient to use.

Another object of this invention is to provide a Christmas tree foot wherein the tree can be erected in a vertical position with a minimum of effort.

Another object of the invention is to provide a Christmas tree foot wherein a tree can be set in the foot at random and the foot adjusted to support the tree in the desired relation while it is in clamped position.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
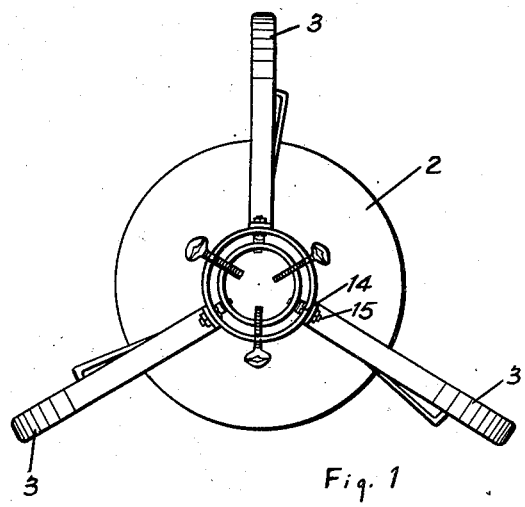
Fig. 1 is a top view of the support according to the invention.
Figure 2:
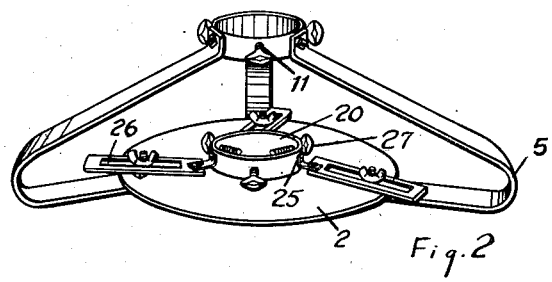
Fig. 2 is a perspective view of the support.
Figure 3:
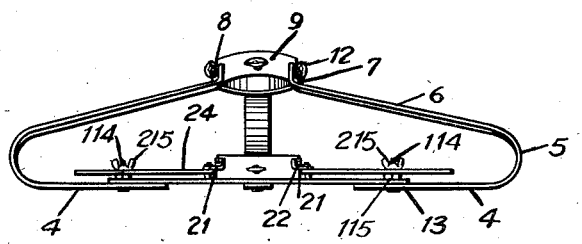
Fig. 3 is a side view of the support shown in Fig. 1.

Now, with more specific reference to the drawing, the support has a disk shaped lower portion 2 with legs 3 having a generally horizontal portion 4 and bent on a long radius at 5 to join an upwardly and inwardly extending portion 6 and then bent upwardly at 7 to form an upwardly extending portion 8 which engages upper trunk or clamping ring 9. The upper trunk ring 9 is formed from a continuous strap like portion bent in ring shaped form and having threaded openings 11 to receive thumb screws or bolts 12 and having bores therethrough at 14 to receive bolts 15 which extend through holes in the legs 6.

The base disk 2 has holes therein which are adapted to register with holes at 13 in the horizontal portion 4 through which extend bolts 114. The bolts 114 have a nut 115 thereon which rigidly clamps the horizontal portion 4 of the legs 3 to the base disk 2.

A lower trunk or clamping ring 20 has brackets 21 attached thereto at 22 by means of rivets or spot welding. Slotted members 24 are pivotally attached to the bracket members 21 at 25. The adjusting members 24 are flat and have a slot 26 therein which receives the upper end of the bolts 114. Wing nuts 215 are threadably supported on the bolts 114. The lower trunk ring 20 has spaced threaded holes therein which are adapted to receive bolts 27. The bolts 27 can be tightened or loosened as desired to clamp various sizes of tree trunks in the lower trunk ring 20.

When used to support a tree, the tree foot will be set on a floor or other support. The bolts 12 in upper clamping ring 9 will be loosened so that the trunk of the tree can be pushed therethrough and the lower bolts 27 will be turned outward to receive the butt of the trunk. Then the wing nuts 215 will be loosened and the operator may grasp the tree trunk above the upper clamping ring 9 and straighten it by causing the butt to pivot about the bolts 12 as a fulcrum to push the lower ring 20 to the desired position on base plate 2 with the slotted members 24 sliding on the bolts 114. When the tree trunk is in the desired position, the thumb screws 12 will be tightened to clamp the tree in that position and the lower bolts 27 will be tightened on the butt. Then the wing nuts 215 will be tightened to clamp the lower clamping ring 20 in this position. Thus, the lower clamping ring may be clamped in any desired position on the upper surface of the plate 2.

It is possible with the structure shown to move the lower clamping ring 20 to practically any desired position around the disk 2, thereby providing an extremely broad range of adjustment for the tree foot.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tree support comprising a flat plate like member, legs attached to said plate like member at their lower ends and extending upwardly therefrom, an upper clamping ring, said legs being attached to said upper clamping ring at their upper ends, means on said upper clamping ring to engage a tree trunk, a lower clamping ring shiftably mounted on said plate like member and adapted to receive the butt of a tree trunk, a plurality of members having slots therein swingably attached to said lower clamping ring, bolts attached to said plate and extending upwardly therefrom and extending through said slots in said members, and nuts on said bolts engaging said members having slots, said bolts adapted to be loosened whereby said members may be slid on said bolts allowing said lower clamping ring to be moved over the area of said plate to various positions around the center thereof, said nuts being adapted to be tightened on said members to lock said lower clamping ring in the desired position.

2. A tree support comprising a plate, a plurality of holes formed in said plate and spaced therearound, leg members extending outwardly from said plate and then upwardly and inwardly therefrom, holes in said legs in the lower end thereof registering with the holes in said plate member, bolts extending through said holes in said legs and through said plate, adjusting members disposed on said plate and extending outwardly therefrom having slots therein receiving the upper ends of said bolts, nuts disposed on said bolts above said outwardly extending members and clamping said leg members and said outwardly extending members in a position, a lower clamping ring adjustably disposed on said plate, said outwardly extending members being swingably attached at their inner ends to said lower clamping ring, means on said lower clamping ring to clamp the butt of a tree trunk therein, an upper clamping ring, said inwardly extending portions in said leg members being attached to said upper clamping ring, and means on said upper clamping ring for engaging an intermediate portion of the trunk of a tree.

3. A tree support comprising a flat plate, spaced legs extending upwardly from said plate and converging toward each other at the upper ends thereof, means on the upper ends of said legs to engage an intermediate part of the trunk of a tree, means adjustably supported on said plate to engage the lower end of said tree trunk on said plate selectively in a plurality of positions thereon, said means adjustably supported on said plate comprising a lower clamping ring, further comprising spaced brackets attached to the outside of said ring, still further comprising elongated slotted members swingably attached to said brackets, and still further comprising clamping means on said plate being received in said slots with said slotted members slidable thereon, said elongated members being slidable on said clamping means to bring said clamping ring to any predetermined position on said plate whereby a tree supported in said support can have its trunk moved into a plurality of positions to bring said tree trunk to optimum vertical position.

References Cited in the file of this patent

UNITED STATES PATENTS

| | | |
|---|---|---|
| 283,392 | Henneberg | Aug. 21, 1883 |
| 650,001 | Becker et al. | May 22, 1900 |
| 848,850 | Pissahl | Apr. 2, 1907 |
| 1,155,383 | Tischer | Oct. 5, 1915 |
| 1,943,269 | Holden | Jan. 9, 1934 |
| 2,221,205 | Schultz et al. | Nov. 12, 1940 |
| 2,502,040 | Franklin | Mar. 28, 1950 |
| 2,703,213 | Zamierowski | Mar. 1, 1955 |